(12) United States Patent
Utler et al.

(10) Patent No.: US 10,352,318 B2
(45) Date of Patent: Jul. 16, 2019

(54) HYDRAULIC REGULATING DEVICE

(71) Applicant: Robert Bosch GmbH, Stuttgart (DE)

(72) Inventors: Andreas Utler, Krumbach (DE); Ralf Joechle, Blaustein (DE); Rolf Wiefel, Dornstadt (DE); Steffen Raschendorfer, Bibertal (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 15/655,603

(22) Filed: Jul. 20, 2017

(65) Prior Publication Data

US 2018/0058442 A1 Mar. 1, 2018

(30) Foreign Application Priority Data

Aug. 25, 2016 (DE) .................. 10 2016 215 993

(51) Int. Cl.
| | |
|---|---|
| *F04B 49/22* | (2006.01) |
| *F04B 49/10* | (2006.01) |
| *F04B 53/10* | (2006.01) |
| *F16K 31/122* | (2006.01) |

(52) U.S. Cl.
CPC .............. *F04B 49/22* (2013.01); *F04B 49/10* (2013.01); *F04B 53/1077* (2013.01); *F16K 31/1221* (2013.01)

(58) Field of Classification Search
None
See application file for complete search history.

(56) References Cited

U.S. PATENT DOCUMENTS

| | | | |
|---|---|---|---|
| 9,453,518 B2* | 9/2016 | Schulz | G05D 16/2013 |
| 2006/0016327 A1* | 1/2006 | Jeon | F15B 11/0445 |
| | | | 91/461 |
| 2018/0283371 A1* | 10/2018 | Bozic | B60K 17/356 |

FOREIGN PATENT DOCUMENTS

DE 43 29 164 C2 2/1998

OTHER PUBLICATIONS

Axialkolben-Verstellpumpe A10VSO, RD 92177 Data Sheet, Edition 01.12 (Jan. 2012), Replaces: 06.09, German Language, Bosch Rexroth AG, Horb a.N., Germany (48 pages).
Axial piston variable pump A10VSO Series 31, RE 92177 Data Sheet, Edition 01.12 (Jan. 2012), Replaces: 06.09, English Language, Bosch Rexroth AG, Horb a.N., Germany (48 pages).

* cited by examiner

*Primary Examiner* — P. Macade Nichols
(74) *Attorney, Agent, or Firm* — Maginot, Moore & Beck LLP

(57) ABSTRACT

A hydraulic regulating device includes a continuously adjustable regulating valve with a control piston. The control piston is displaceable in a first direction in which a connection of a pump port to an actuating-pressure port is configured to be controlled to open. The control piston is also displaceable in a second direction in which a connection of the actuating-pressure port to a tank port is configured to be controlled to open. In the first direction, the pump pressure acts on the control piston, and in the second direction, a control pressure and a spring act on the control piston. During movement of the control piston in the first direction, a damping connection, equipped with a damping nozzle, from the pump port to the tank port is configured to be controlled to open.

15 Claims, 2 Drawing Sheets

HYDRAULIC REGULATING DEVICE

This application claims priority under 35 U.S.C. § 119 to patent application no. DE 10 2016 215 993.3, filed on Aug. 25, 2016 in Germany, the disclosure of which is incorporated herein by reference in its entirety.

BACKGROUND

The disclosure relates to a hydraulic regulating device for the actuating-pressure medium of an adjustment device of a hydrostatic pump.

Document DE 43 29 164 C 2 shows in FIG. 2B a regulating device of said type, via which the actuating-pressure medium supply for an actuating cylinder of a stroke volume of a hydrostatic pump is regulated in dependence on the pump pressure.

In the applicant's publication RD 9 2711/01.12 A10VSO Series 31, a regulating device is shown on page 15/48, via which an actuating-pressure medium supply of an actuating cylinder is likewise regulated. During filling with actuating-pressure medium, the stroke volume of the pump is reduced, and during release of actuating-pressure medium from the actuating cylinder, the stroke volume of the pump is increased.

A disadvantage of the latter regulating device is that, under certain circumstances, it can have a tendency to vibrate.

By contrast, it is the object of the disclosure to provide a regulating device, the regulating behavior of which is improved without permanent increase of the leakage.

SUMMARY

Said object is achieved by a regulating device having the features of the disclosure.

The claimed hydraulic regulating device has a continuously adjustable regulating valve, the control piston of which is displaceable in a first direction in which a connection of a pump port to an actuating-pressure port can be controlled to open. This serves in particular for reducing a stroke volume of a hydrostatic pump. The control piston is furthermore displaceable in a second direction in which a connection of the actuating-pressure port to a tank port can be controlled to open. This serves in particular for increasing the stroke volume of the pump. In the first direction, the pump pressure acts on the control piston, and in the second direction, a control pressure and a spring act on the control piston. According to the disclosure, during movement of the control piston in the first direction, a damping connection, equipped with a damping nozzle, from the pump port to the tank port can be controlled to open. Excessive vibration of the regulating device known from the prior art is thereby effectively prevented without permanent increase of the leakage.

Further advantageous configurations of the disclosure are described in the dependent patent claims.

In a particularly preferred refinement, the regulating valve is designed such that, during movement of the control piston in the first direction, firstly the connection from the pump port to the actuating-pressure port, and subsequently the damping connection, are controlled to open. Consequently, the nozzling according to the disclosure is carried out only in the case of pressure peaks at the pump port.

In a particularly preferred design of the regulation arrangement, the control pressure is tapped off from the pump port via a nozzle and reduced and adjusted via a pressure-relief valve. If, here, the pressure-relief valve can be adjusted by an electromagnet, the corresponding electrical signal can depend on the pressure of that consumer from the consumers supplied by the pump which has the highest load, and the pump in question can be regulated in a load-sensing manner.

In a preferred configuration, an adjustment device is provided for pre-tensioning of a spring of the pressure-relief valve.

On the control piston there is preferably formed a neck, on the outer circumference of which the pump port is arranged. Axially adjacent to the neck there is arranged a piston collar, via the movement of which in the first direction firstly the said connection of the pump port to the actuating-pressure port and secondly the damping connection can be controlled to open, and via the movement of which in the second direction the said connection of the actuating-pressure port to the tank port can be controlled to open.

Preferably, on the outer circumference of the piston collar, an actuating-pressure channel connected to the actuating-pressure port and a damping-channel section of the damping connection are arranged on mutually opposite sides of the control piston or of a valve bore of the regulating valve and in a central position of the control piston.

If the actuating-pressure channel and the damping-channel section are concentric with respect to one another, they can be produced with a common bore in a simple manner.

If a mouth of the damping-channel section into the valve bore of the regulating valve is smaller than a mouth, forming the actuating-pressure port, of the actuating-pressure channel into the valve bore, the abovementioned sequence in the case of the controlled opening of the connections in the stated sequence is ensured.

If the two mouths are concentric with respect to one another, they can be produced in a simple manner.

An encircling annular groove is preferably formed on the outer circumference of the piston collar. Consequently, a connection between the actuating-pressure channel and the damping-channel section ensured, at least over partial regions of the movement in both movement directions of the control piston.

A pump-pressure space encircling the neck is preferably connected via at least one radial bore and via a longitudinal bore of the control piston firstly to a—preferably end-side—pump-pressure space acting in the first direction and secondly via the nozzle to a control-pressure space acting in the second direction.

The control-pressure space can in turn be connected to the pressure-relief valve via a control-pressure channel in a simple manner in terms of device technology, in order that the control pressure can be reduced and adjusted by said valve.

In a particularly preferred configuration of the regulating arrangement according to the disclosure, said arrangement has a—e.g. block-like-housing in which the control piston of the regulating valve and the pressure-relief valve form a first plane.

It is simple in terms of production if the actuating-pressure channel and/or the damping-channel section are also arranged in the first plane.

Production is further simplified if the control-pressure channel is also arranged in the first plane.

The actuating-pressure channel and the damping nozzle can form a second plane which is perpendicular to the first plane.

Between the actuating-pressure port and the tank port it is possible to provide a nozzle which is also arranged, in a simple manner in terms of production, in the second plane.

BRIEF DESCRIPTION OF THE DRAWINGS

An exemplary embodiment of a regulating device according to the disclosure is illustrated in the drawings. The disclosure will now be explained in more detail on the basis of the figures of said drawings.

In the drawings.

DETAILED DESCRIPTION

Figure 1:
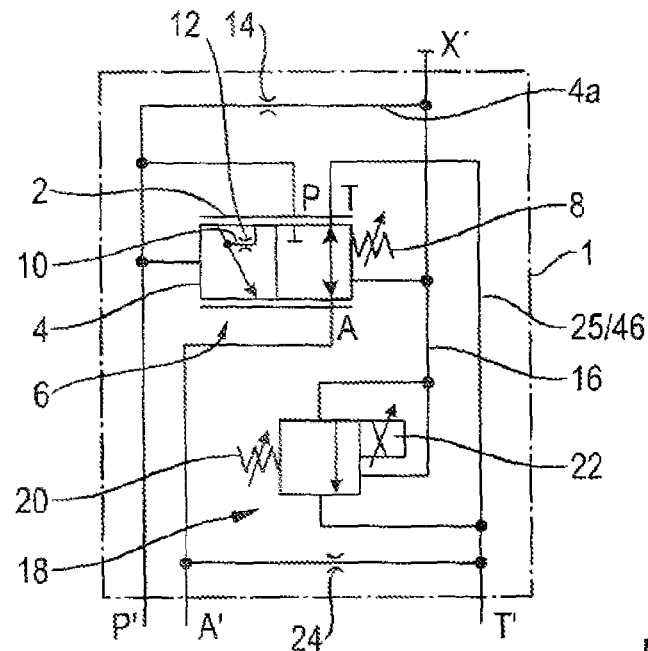
FIG. 1 shows a circuit diagram of the exemplary embodiment of the regulating device according to the disclosure.

FIG. 1 shows a circuit diagram of the exemplary embodiment of the regulating device according to the disclosure. Said device has a housing which is designed for fastening to a housing of a hydrostatic pump which is adjustable in its stroke volume. For this purpose, on the housing 1 of the regulating device there is provided a pump port P', via which the current pump pressure is communicated to the regulating device and via which pump-pressure medium for operating the regulating device is tapped off.

Furthermore, on the housing 1 there is provided an actuating-pressure port A', via which actuating-pressure medium is delivered to an actuating cylinder of the pump and via which actuating-pressure medium can be released from the actuating cylinder. A delivery of actuating-pressure medium to the actuating cylinder effects a reduction of the stroke volume of the pump, whereas a release of actuating-pressure medium effects an increase in the stroke volume of the pump.

Furthermore, on the housing 1 of the regulating device there is provided a tank port T' which is connected to an inner space of a housing of the pump. Finally, on the housing 1 of the regulating device there is provided a control-pressure port X' which is closed off during operation.

In a valve bore 2 of the housing 1, a control piston 4 of a regulating valve 6 is accommodated in a continuously adjustable manner. The regulating valve 6 is designed as a continuously adjustable 3/2 directional valve. Said valve has an actuating-pressure port A, a pump port P and a tank port T, wherein the three ports of the regulating valve 6 are at all times connected to the assigned ports A', P' and T' of the housing 1. In a pre-tensioned home position (shown in FIG. 1) realized by the force of an adjustable spring 8 and by the pressurization with control-pressure medium, the port A, A' is connected to the tank port T, T', as a result of which the pump is set to maximum stroke volume. If, during operation of the pump, the pump pressure at the pump port P', P now increases, and if a force of the pump pressure exceeds the force of the spring 8 and the force of the control-pressure medium, the control piston 4 is moved in a first direction (towards the right in FIG. 1). Consequently, firstly the actuating-pressure port A, A' is shut off with respect to the tank port T, T', and subsequently a connection from the pump port P, P' to the actuating-pressure port A, A' is controlled to open.

Only if the force of the pump pressure considerably exceeds the forces of the spring 8 and of the control-pressure medium, e.g. in the case of a pressure peak of the pump pressure, will a damping connection 10 from the pump port P to the tank port T also be controlled to open. The damping connection 10 opens into a damping nozzle 12. Alternatively, it is possible for the damping nozzle 12 also to be arranged in the damping connection 10. According to the disclosure, the damping nozzle 12 leads to a vibration minimization of the regulating device, without a permanent increase of the leakage of the regulating device thus being necessary.

The control pressure acting in the second direction on the control piston 4 of the regulating valve 6 is tapped off from the pump pressure via a nozzle 14 and can be lowered or reduced by a pressure-relief valve 18 via an actuating-pressure channel 16, as a result of which the pressure-relief valve 18 can adjust the control pressure. For this purpose, the pressure-relief valve 18 has a settable spring 20 which acts in the closing direction and a settable electromagnet 22 which acts in the opening direction. Current is applied to said electromagnet in dependence on the highest load pressure of the consumers supplied by the pump, wherein, in the case of increasing current, the pressure-relief valve 18 is controlled to open, as a result of which the control pressure is lowered, whereby the stroke volume of the pump is reduced.

Between the actuating-pressure port A, A' and the tank port T, T', a connection via a nozzle 24 is provided.

Figure 2:
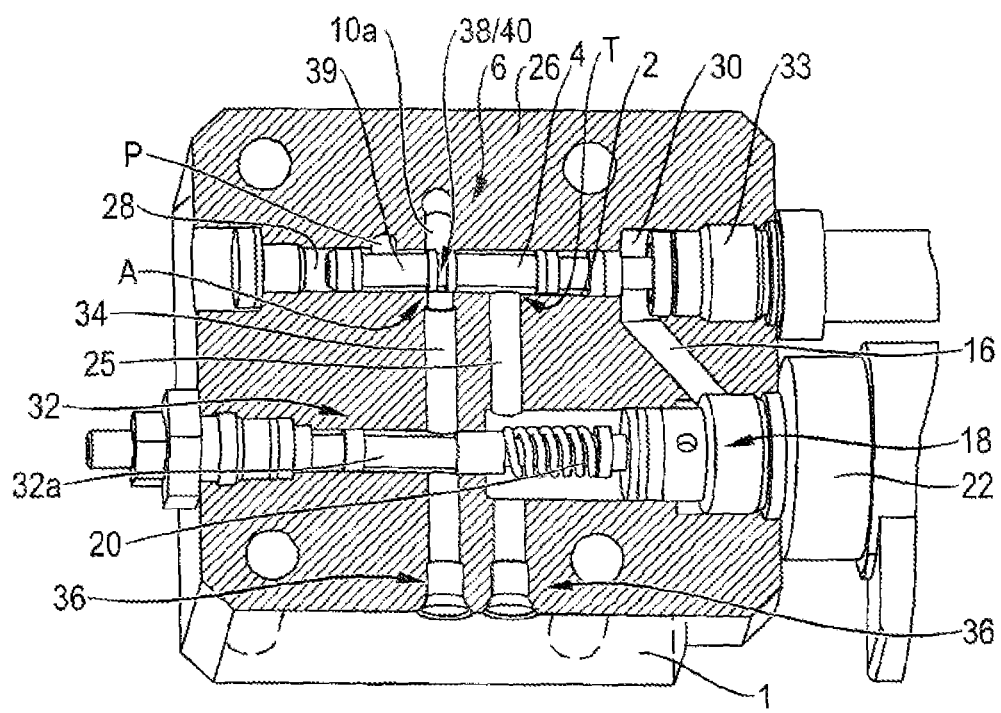
FIG. 2 shows the regulating device from FIG. 1 in a longitudinal section.

FIG. 2 shows in a longitudinal section according to a first plane 26 the sectioned housing 1. The regulating valve 6 is situated with its valve bore 2 and its control piston 4 in the first plane 26. Also, an end-side pump-pressure space 28 acting in the first direction and an oppositely-positioned control-pressure space 30 acting in the second direction and the spring 8 (covered in FIG. 2), including an adjustment device 33 assigned to said spring, are concentric with respect to the valve bore 2 of the regulating device 6 and are situated in the first plane 26.

Furthermore, the pressure-relief valve 18 with the electromagnet 22 and the spring 20, including an adjustment device 32 for pre-tensioning the spring 20, are situated in the first plane 26. The adjustment device 32 has an adjustment piston 32a. Approximately perpendicularly to the stated components of the regulating device there extend, concentrically with respect to one another, a damping-channel section 10a and an actuating-pressure channel 34 which are produced together via a closed-off bore opening 36.

Likewise perpendicularly to the stated components of the regulating device there extends the tank channel 25 which connects the tank port T of the regulating valve 6 and an outlet of the pressure-relief valve 18 to one another in the first plane 26. The tank channel 25 is likewise produced via a closed-off bore opening 36.

Furthermore, in the first plane 26 and in this case obliquely set with respect to the abovementioned bores, there is provided the control-pressure channel 16 which connects the control-pressure space 30 to the inlet of the pressure-relief valve 18.

In FIG. 2, the control piston 4 is displaced from the regulating position, in which it shuts off the actuating-pressure port with zero overlap or with small positive or negative overlap, into a position in which a piston collar 38 is positioned in such a manner that the actuating-pressure port A is shut off with respect to the tank port T and that a connection from the pump port P to the actuating-pressure port A via a neck 39 is controlled to open. The neck 39 is arranged adjacently to the piston collar 38. Since the diameter of the damping-channel section 10a is equally as large as the diameter of the narrowed end section, which is flush with the damping-channel section 10a, of the actuating-pressure channel 34 and that diameter is smaller than the diameter of the valve bore 2, a sickle-shaped through-flow cross section is opened from the annular space encircling the neck 39 into the damping-channel section 10a, and an equally large sickle-shaped through-flow cross section is opened from the annular space encircling the neck 39 into the actuating-pressure channel 34. It is also possible, however, to make the mouth of the damping-channel section 10a into the valve bore 2 smaller than the mouth of the actuating-pressure channel 34 into the valve bore 2, such that at all times firstly the connection from the pump port P to the actuating-pressure port A is controlled to open, before also the connection from the pump port P to the damping-channel section 10a and thus to the damping nozzle 12 (cf. FIG. 1) is controlled to open. A through-flow cross section from the annular space encircling the neck 39 into the damping-channel section 10a will then only become effective after relatively large deflections of the control piston 4.

In the piston collar 38 there is furthermore provided an encircling annular groove 40, via which a connection between the actuating-pressure channel 34 and the damping-channel section 10a arises at least over partial regions of the movement of the control piston 4, and consequently of the piston collar 38, in both directions of movement. In dependence on the size of the sickle-shaped cross section between the neck 39 of the control piston 4 and the damping-channel section 10a and on the opening width of the annular groove 40 and also in dependence on the pump pressure and on the actuating pressure, pressure medium then flows between the annular space encircling the neck 39 of the control piston 4 and the damping-channel section 10a via the sickle-shaped through-flow cross section and also into the actuating-pressure channel 34 via the annular groove 40, or from the actuating-pressure channel 34 into the damping-channel section 10a via the annular groove 40. This too can result in the damping behavior being influenced. What is essential, however, is the direct, throttled, fluidic connection, which is controlled to open during movement of the control piston in the first direction, from the annular space encircling the neck 39 of the control piston, and thus from the pump port P, to the tank port, with bypassing of the actuating-pressure port A.

In the region of the neck 39 of the control piston 4 there are provided radial bores which open into a longitudinal bore which passes through the entire actuating piston 4. In the region between the neck 39 and the control-pressure space 30, the nozzle 14 (shown in FIG. 1) is provided in the longitudinal bore. Consequently, the pump pressure from the pump port P is firstly communicated to the pump-pressure space 28, and secondly, the control-pressure space 30 is filled with control-pressure medium by the pump pressure via the nozzle 14, wherein the control pressure—as explained already—is determined by way of the pressure-relief valve 18.

Figure 3:
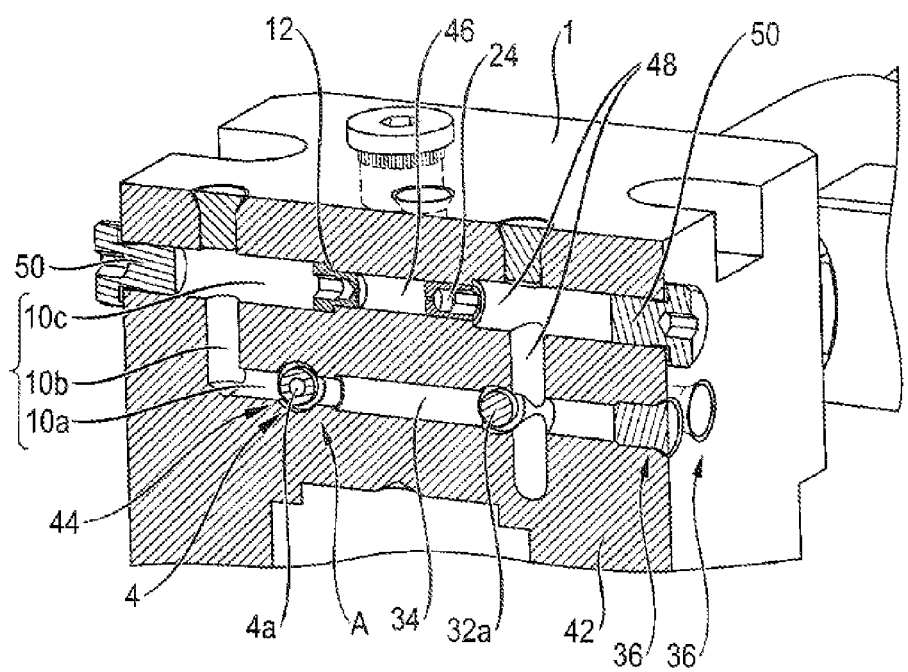
FIG. 3 shows the regulating device from FIG. 1 in a cross section.

FIG. 3 shows a section along a second plane 42 through the housing 1, wherein the second plane 42 is arranged perpendicularly with respect to the first plane 26 (according to FIG. 2) and thereby also contains the actuating-pressure channel 34 and, arranged concentrically with respect thereto, the damping-channel section 10a. As a result, FIG. 3 shows the control piston 4 and the adjustment piston 32a of the adjustment device 32 for the spring 20 of pressure-relief valve 18 (cf. FIG. 2) in cross section.

Furthermore, on the outer circumference of the control piston 4, both the mouth of the actuating-pressure port A and the mouth 44 of the damping-channel section 10a are shown, wherein the former mouth of the actuating-pressure port A is larger than the mouth 44 of the damping-channel section 10a.

Furthermore, the nozzles 12, 24, which are connected to a tank channel 46, are also arranged in the second plane 42, wherein, opposite the damping nozzle 12, the nozzle 24 (cf. FIG. 1) opens into the tank channel 46. The tank channel 46 is connected to the tank channel 25 (shown in FIG. 2), which extends in a parallel manner with respect thereto, and to the tank port T', shown in FIG. 1, of the housing 1.

Furthermore, in the second plane 42 there is situated an approximately L-shaped actuating-pressure channel 48, via which the nozzle 24 is connected to the outer region of the adjustment piston 32a for the spring 20 of the pressure-relief valve 18. Here, on the outer region of the adjustment piston 32a, there is provided a pressure-medium connection of the L-shaped actuating-pressure channel 48 to the actuating-pressure channel 34 which opens into the regulating valve 4 via the actuating-pressure port A.

It follows that, in the second plane 42, there is a continuous bore through the housing 1, with a damping-channel section 10c, with the damping nozzle 12, with the tank channel 46, with the nozzle 24 and with part of the L-shaped actuating-pressure channel 48. This continuous bore is closed off on both sides via closure elements.

A hydraulic regulating device having a continuously adjustable regulating valve is disclosed, the control piston of which valve is displaceable in a first direction in which a connection of a pump port to an actuating-pressure port can be controlled to open. The control piston is furthermore displaceable in a second direction in which a connection of the actuating-pressure port to a tank port can be controlled to open. In the first direction, the pump pressure acts on the control piston, and in the second direction, a control pressure and a spring act on the control piston. In this case, during movement of the control piston in the first direction, a damping connection, equipped with a damping nozzle, from the pump port to the tank port can be controlled to open.

LIST OF REFERENCE SIGNS

1 Housing
2 Valve bore
4 Control piston
4a Longitudinal bore
6 Regulating valve
8 Spring
10 Damping connection
10a Damping-channel section
10b Damping-channel section
10c Damping-channel section
12 Damping nozzle
14 Nozzle
16 Control-pressure channel
18 Pressure-relief valve
20 Spring
22 Electromagnet
24 Nozzle
25 Tank channel
26 First plane
28 Pump-pressure space
30 Control-pressure space
32 Adjustment device
32a Adjustment piston
33 Adjustment device
34 Actuating-pressure channel
36 Bore opening 38 Piston collar
39 Neck
40 Annular groove
42 Second plane
44 Mouth
46 Tank channel
48 Actuating-pressure channel
50 Closure element
A Actuating-pressure port of regulating valve
A' Actuating-pressure port of housing
P Pump port of regulating valve
P' Pump port of housing
T Tank port of regulating valve
T' Tank port of housing
X' Control-pressure port of housing

What is claimed is:

1. A hydraulic regulating device, comprising:
a continuously adjustable regulating valve with a control piston, the control piston displaceable in (i) a first direction in which a connection of a pump port to an actuating-pressure port is configured to be controlled to open and (ii) a second direction in which a connection of the actuating-pressure port to a tank port is configured to be controlled to open,
wherein the pump pressure acts on the control piston in the first direction,
wherein a control pressure and a spring act on the control piston in the second direction, and
wherein, during movement of the control piston in the first direction, a damping connection, equipped with a damping nozzle, from the pump port to the tank port is configured to be controlled to open.

2. The regulating device according to claim 1, wherein, during movement of the control piston in the first direction, the connection from the pump port to the actuating-pressure port is controlled to open before the damping connection is controlled to open.

3. The regulating device according to claim 1, wherein the control pressure is tapped off from the pump port via a nozzle and is configured to be reduced and adjusted via a pressure-relief valve.

4. The regulating device according to claim 3, wherein the pressure-relief valve is configured to be adjusted by an electromagnet.

5. The regulating device according to claim 1, wherein:
the control piston has a neck with an outer circumference, the pump port being arranged on the outer circumference, a piston collar being arranged axially adjacent to the neck,
the connection of the pump port to the actuating-pressure port is configured to be controlled to open via movement of the piston collar in the first direction,
the damping connection is configured to be controlled to open via movement of the piston collar in the first direction, and
the connection of the actuating-pressure port to the tank port is configured to be controlled to open via movement of the piston collar in the second direction.

6. The regulating device according to claim 5, wherein, in the region of the piston collar, an actuating-pressure channel connected to the actuating-pressure port and a damping-channel section of the damping connection are arranged on mutually opposite sides of the control piston or of a valve bore of the regulating valve.

7. The regulating device according to claim 6, wherein:
during movement of the control piston in the first direction, the connection from the pump port to the actuating-pressure port is controlled to open before the damping connection is controlled to open, and
a mouth of the damping-channel section into the valve bore is smaller than a mouth, forming the actuating-pressure port, of the actuating-pressure channel into the valve bore.

8. The regulating device according to claim 5, wherein an annular groove is formed on the outer circumference of the piston collar.

9. The regulating device according to claim 5, wherein:
the control pressure is tapped off from the pump port via a nozzle and is configured to be reduced and adjusted via a pressure-relief valve, and
the neck is connected via at least one radial bore and via a longitudinal bore of the control piston firstly to a pump-pressure space acting in the first direction and secondly via the nozzle to a control-pressure space acting in the second direction.

10. The regulating device according to claim 9, wherein the control-pressure space is connected to the pressure-relief valve via a control-pressure channel.

11. The regulating device according to claim 3, further comprising a housing in which the control piston of the regulating valve and the pressure-relief valve form a first plane.

12. The regulating device according to claim 6, wherein:
the control pressure is tapped off from the pump port via a nozzle and is configured to be reduced and adjusted via a pressure-relief valve,
the regulating device includes a housing in which the control piston of the regulating valve and the pressure-relief valve form a first plane, and
one or more of the actuating-pressure channel and the damping-channel section are arranged in the first plane.

13. The regulating device according to claim 11, wherein the control-pressure space is connected to the pressure-relief valve via a control-pressure channel, and wherein the control-pressure channel is arranged in the first plane.

14. The regulating device according to claim 7, wherein:
the control pressure is tapped off from the pump port via a nozzle and is configured to be reduced and adjusted via a pressure-relief valve,
the regulating device includes a housing in which the control piston of the regulating valve and the pressure-relief valve form a first plane, and
the actuating-pressure channel and the damping nozzle form a second plane which is perpendicular to the first plane.

15. The regulating device according to claim 14, wherein between the actuating-pressure port and the tank port there is provided a nozzle which is arranged in the second plane.

* * * * *